United States Patent
Lee

(10) Patent No.: US 6,876,171 B2
(45) Date of Patent: Apr. 5, 2005

(54) DRIVING APPARATUS AND METHOD OF THREE PHASE INDUCTION MOTOR

(75) Inventor: Jae-Choon Lee, Seoul (KR)

(73) Assignee: LG Electronics, Seoul (KR)

( * ) Notice: Subject to any disclaimer, the term of this patent is extended or adjusted under 35 U.S.C. 154(b) by 0 days.

(21) Appl. No.: 10/414,400

(22) Filed: Apr. 16, 2003

(65) Prior Publication Data

US 2004/0075414 A1 Apr. 22, 2004

(30) Foreign Application Priority Data

Oct. 17, 2002 (KR) .................................. 10-2002-0063555

(51) Int. Cl.[7] .............................. H02P 1/26; H02P 7/36; H02P 5/34
(52) U.S. Cl. ....................... 318/767; 318/757; 318/801; 318/803; 318/808
(58) Field of Search .............................. 318/751, 767, 318/774, 787, 781, 729, 802, 805, 808; 363/37, 55, 41

(56) References Cited

U.S. PATENT DOCUMENTS

| | | | | |
|---|---|---|---|---|
| 3,691,439 A | * | 9/1972 | Jensen et al. ............... | 318/808 |
| 3,983,463 A | * | 9/1976 | Nabae et al. ............... | 318/803 |
| 4,019,105 A | * | 4/1977 | Cornell et al. .............. | 318/803 |
| 4,319,177 A | * | 3/1982 | Kawada et al. ............. | 318/798 |
| 4,353,023 A | * | 10/1982 | Kawada et al. ............. | 318/762 |
| 4,379,258 A | * | 4/1983 | Sugimoto ................... | 318/805 |
| 4,417,193 A | * | 11/1983 | Hirata ........................ | 318/803 |
| 4,426,610 A | * | 1/1984 | Kawada et al. ............. | 318/798 |
| 4,434,393 A | * | 2/1984 | Kobari et al. ............... | 318/757 |
| 4,532,464 A | * | 7/1985 | Igarashi et al. ............. | 318/807 |
| 4,611,158 A | * | 9/1986 | Nagase et al. .............. | 318/803 |
| 4,688,162 A | * | 8/1987 | Mutoh et al. ................ | 363/80 |
| 4,689,543 A | * | 8/1987 | Hucker ....................... | 318/798 |
| 4,719,550 A | * | 1/1988 | Powell et al. ................ | 363/37 |
| 4,788,485 A | | 11/1988 | Kawagishi et al. | |
| 5,489,833 A | * | 2/1996 | Escudero .................... | 318/801 |
| 5,726,550 A | | 3/1998 | Inaniwa et al. | |
| 5,747,833 A | * | 5/1998 | Fujisaki et al. ............. | 318/808 |
| 5,932,979 A | * | 8/1999 | Sun ............................ | 318/254 |
| 6,009,003 A | * | 12/1999 | Yeo ............................ | 363/37 |
| 6,072,302 A | * | 6/2000 | Underwood et al. ......... | 322/17 |
| 6,153,993 A | * | 11/2000 | Oomura et al. ............. | 318/434 |
| 6,275,093 B1 | | 8/2001 | Shekhawat et al. | |
| 6,407,531 B1 | * | 6/2002 | Walters et al. ............. | 318/805 |
| 6,686,718 B2 | * | 2/2004 | Jadric et al. ................ | 318/801 |
| 2003/0102718 A1 | * | 6/2003 | Hockney et al. ............. | 307/43 |

FOREIGN PATENT DOCUMENTS

EP 1018798 7/2000

OTHER PUBLICATIONS

"A Switched Reluctance Motor Drive Operating at Unity Power Factor", Sep. 1996.

* cited by examiner

*Primary Examiner*—Paul Ip
(74) *Attorney, Agent, or Firm*—Greenblum & Bernstein, P.L.C.

(57) ABSTRACT

A driving apparatus of a three-phase induction motor includes: a three-phase power supply unit for supplying three-phase power; a rectifier for rectifying the three phase voltage supplied from the three phase power supply unit; a voltage reducing unit for reducing a DC voltage generated from the rectifier and outputting a stabilized DC voltage; and an inverter unit for varying the DC voltage outputted from the voltage reducing unit to a three-phase AC voltage and driving a three-phase induction motor. A power-factor degradation generated during supplying a DC voltage to the inverter to drive the three-phase induction motor is prevented, a harmonic wave is removed, and because a high-priced inverter component is not necessary, its relevant expense is reduced.

15 Claims, 4 Drawing Sheets

DRIVING APPARATUS AND METHOD OF THREE PHASE INDUCTION MOTOR

BACKGROUND OF THE INVENTION

1. Field of the Invention

The present invention relates to a driving apparatus and method of an induction motor and, more particularly, to a driving apparatus and method of an induction motor that are capable of preventing a power-factor degradation possibly caused in supplying a DC voltage to an inverter to drive a three phase induction motor, removing a harmonic wave, and capable of reducing an expense by not using a high-priced inverter component.

2. Description of the Background Art

In general, an induction motor is used to drive an air-conditioner. The induction motor signifies a motor consisting of a stator which is not rotated and a rotor which is rotatable.

In other words, when a current is supplied to generate a rotating magnetic field at a coil wound on, an induction current flows at the rotor winding due to an electromagnetic induction, according to which torque is generated to rotate the induction motor.

FIG. 1 shows a construction of a driving apparatus of a single-phase induction motor in accordance with a conventional art.

As shown in FIG. 1, when a single phase 220V AC voltage is supplied from a single-phase power supply unit 1, a rectifier 2 rectifies it to a DC voltage of about 300V. The rectified voltage is boosted to about 400V through a power circuit unit 3 and transferred to an inverter unit. Then, the induction motor is finally driven.

Recently, in order to drive the air-conditioner, a three-phase induction motor using three-phase power is increasingly used.

FIG. 2 is a block diagram showing a construction of a driving apparatus of the three-phase induction motor in accordance with the conventional art.

As shown in FIG. 2, the apparatus for driving the three-phase induction motor includes: a three-phase power supply unit 11 for supplying three-phase 380V voltage; a rectifier 12 for rectifying the three-phase voltage; and an inverter unit 13 for driving a three-phase induction motor 14 according to the voltage which has been rectified to a DC voltage of 530V by the rectifier unit 12.

However, because the three-phase induction motor driving apparatus rectifies the high voltage and repeatedly supplies it to the inverter unit, a power-factor is inevitably degraded and a harmonic wave is inevitably generated.

In addition, in order to implement the inverter unit, a high-priced inverter circuit component with a withstand voltage of 1200V should be used. In such a case, an expense required for implementing the driving apparatus of the three-phase induction motor is increased and a high voltage-purposed compressor, not a low voltage-purposed compressor used for the existing single-phase power supply system, should be newly developed for use.

SUMMARY OF THE INVENTION

Therefore, an object of the present invention is to provide a driving apparatus and method of a three-phase induction motor that are capable of preventing a power-factor degradation possibly caused in supplying a DC voltage to an inverter to drive a three phase induction motor, removing a harmonic wave, and capable of reducing an expense by not using a high-priced inverter component.

To achieve these and other advantages and in accordance with the purpose of the present invention, as embodied and broadly described herein, there is provided a driving apparatus of a three-phase induction motor including: a three-phase power supply unit for supplying three-phase power of 380V; a rectifier for rectifying the three phase voltage supplied from the three phase power supply unit to a DC voltage of 530V; a voltage reducing unit for reducing the DC voltage outputted from the rectifier to stabilize it; and an inverter unit for varying the stabilized DC voltage outputted from the voltage reducing unit to a three-phase AC voltage and driving a three-phase induction motor.

To achieve the above objects, there is also provided a driving method of a three-phase induction motor including: a rectifying step of rectifying a three-phase voltage; a measuring step of measuring a size of the voltage rectified in the rectifying step; and a rectified voltage size controlling step of controlling a size of a rectified voltage supplied to an inverter unit which drives a three-phase induction motor according to the size of the voltage measured in the measuring step.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
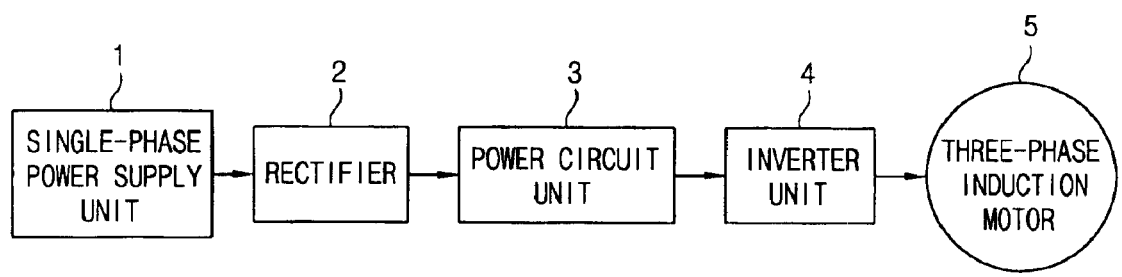
FIG. 1 is a block diagram showing a construction of a driving apparatus of a single-phase induction motor in accordance with a conventional art.
Figure 2:
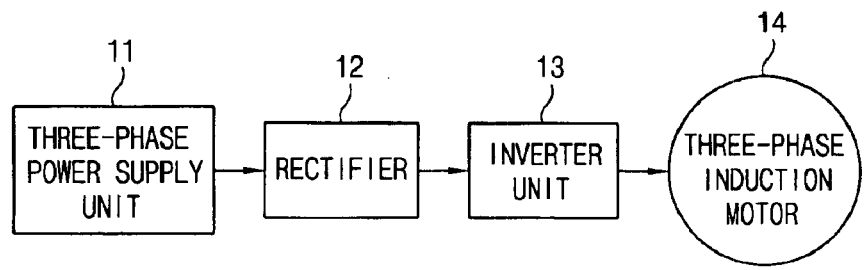
FIG. 2 is a block diagram showing a construction of a driving apparatus of a three-phase induction motor in accordance with a conventional art.
Figure 3:
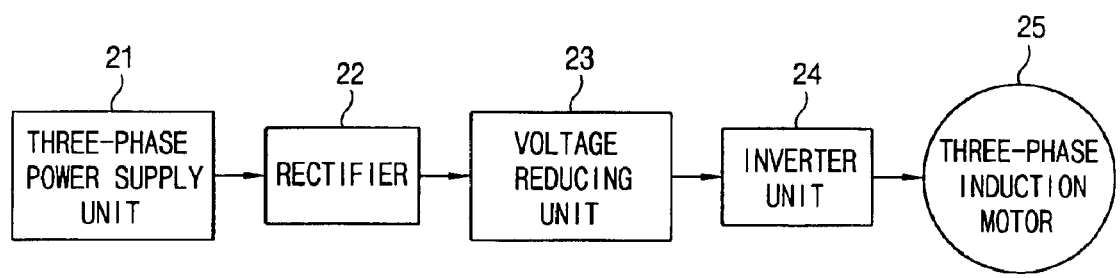
FIG. 3 is a block diagram showing a construction of a driving apparatus of a three-phase induction motor in accordance with the present invention.

FIG. 3 is a block diagram showing a construction of a driving apparatus of a three-phase induction motor in accordance with the present invention.

As illustrated, a driving apparatus of the three-phase induction motor in accordance with the present invention includes: a three-phase power supply unit 21 for supplying three-phase power of 380V; a rectifier 22 for rectifying the three-phase voltage supplied from the three-phase power supply unit 21 to a DC voltage of 630V; a voltage reducing unit 23 for reducing the DC voltage outputted from the rectifier 22 to stabilize it; and an inverter unit 24 for varying the stabilized DC voltage outputted from the voltage reducing unit 23 to a three-phase AC voltage and driving a three-phase induction motor 25.

The three-phase power supply unit 21, the rectifier 22 and the inverter unit 24 can be easily implemented by a person with an ordinary skill in the art, descriptions of which are thus omitted.

Figure 4:
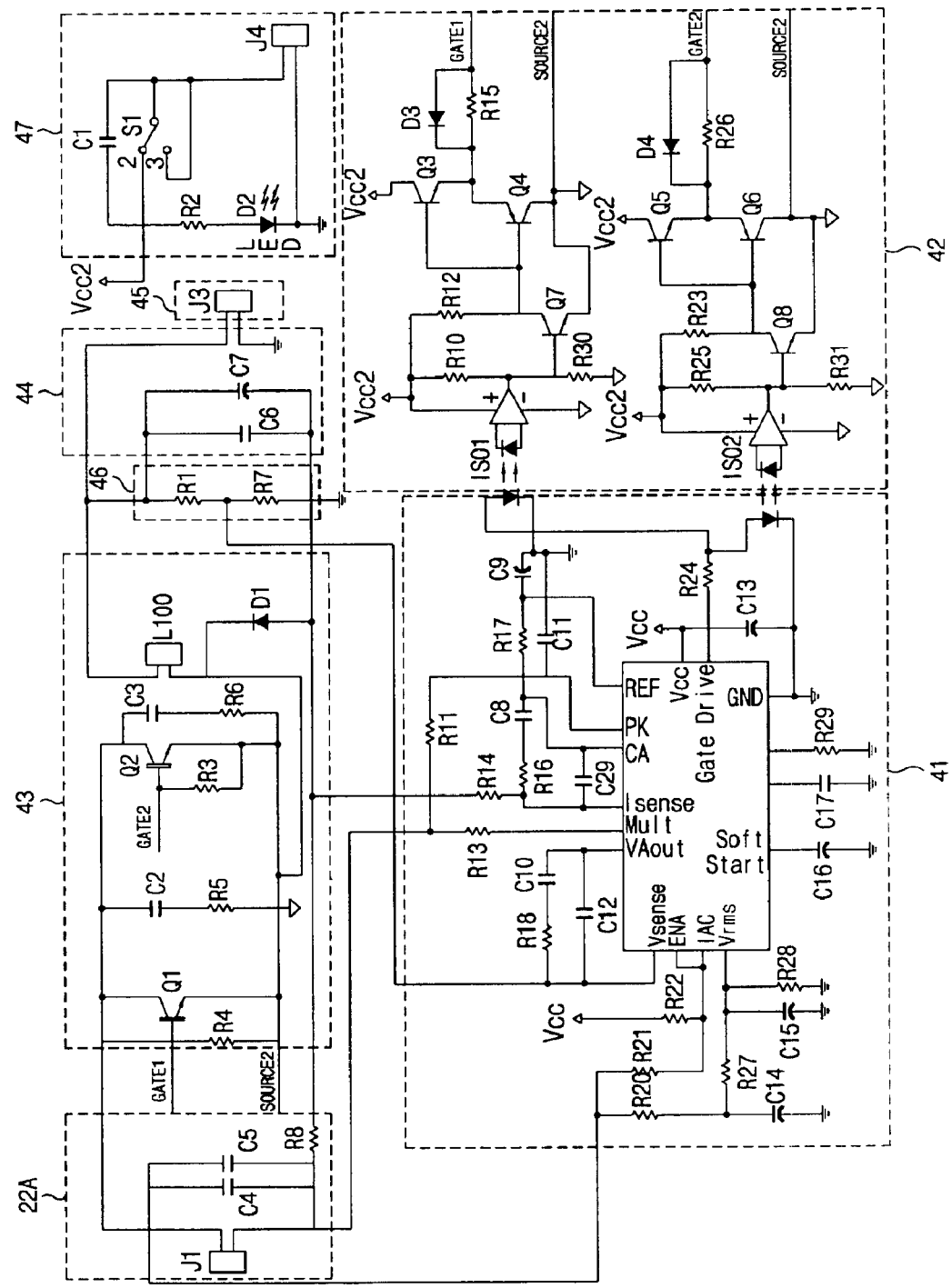
FIG. 4 is a detailed circuit diagram showing a construction of a voltage reducing unit of FIG. 3.

FIG. 4 is a detailed circuit diagram showing a construction of a voltage reducing unit of FIG. 3.

As illustrated, the voltage reducing unit 23 includes: an integrated circuit unit 21 for measuring a voltage generated from the rectifier 22 and outputting qa control signal to control a DC voltage outputted to the inverter unit 24 according to the measured voltage; a gate driving unit 42 for generating a drive signal to drive is the inverter unit 24 according to the control signal outputted from the integrated circuit unit 41; a DC stabilizer 43 for reducing a DC voltage generated from the rectifier 22 according to the drive signal of the gate driving unit 42 and generating stabilized DC voltage; a DC link unit 44 for linking the DC voltage generated from the DC stabilizer 43; a load unit 45 for supplying the DC voltage applied to the DC link unit 44 to the inverter unit 24; a voltage measuring unit 46 for measuring the DC voltage linked to the DC link unit 44; and a switch unit 47 for supplying power to the integrated circuit unit 41.

Resistances R1 and R7, which are connected in series, of the voltage measuring unit 46 and condensers C6 and C7, which are connected in parallel, of the DC link unit 44 are connected in parallel.

The switch unit 47 includes a switch S1 for selectively outputting power (J4) of 18V and inputting a voltage to the integrated circuit unit 41; a resistance R2 connected in series to the switch S1 and the condenser C1; and an LED diode D2 connected in series to the resistance R2.

In particular, when the switch S1 is connected to terminal 3, source voltage (Vcc) is not supplied to the integrated circuit unit 41, so the integrated circuit unit 41 is not operated. Meanwhile, when the switch S1 is connected to terminal 2, source voltage (Vcc) is supplied to the integrated circuit unit 41, so the integrated circuit unit 41 is operated.

The integrated circuit unit 41 measures the size of the DC voltage outputted from a rectifying/outputting terminal 22A through condensers C4 and C5 which are connected in parallel to the rectifying/outputting terminal 22A of the rectifier 22 and accordingly controls a control signal outputted from a gate drive of the integrated circuit unit 41. In other words, the integrated circuit unit 41 converts the DC voltage outputted from the rectifying/outputting terminal 22A into a current value, compares the current value with a reference current, an effective value of a reference DC voltage, and generates a control signal according to the comparison value.

The integrated circuit unit 41 measures a current supplied to the DC stabilizer 43 through a resistance R8, and if the measured current is an overcurrent above the reference current, the integrated circuit unit 41 cuts off output of the control signal.

The integrated circuit unit 41 measures a voltage applied to the DC link unit 44 through the voltage measuring unit 46, and if the voltage applied to the DC link unit 44 is an overvoltage above a reference value, the integrated circuit unit 41 also cuts off output of the control signal.

In the integrated circuit unit 41, for a smooth operation, a plurality of resistances R11, R13, R14, R16, R17, R18, R20, R21, R22, R24, R27, R28 and R29 and a plurality of condensers C8, C9, C10, C11, C12, C13, C14, C15, C16 and C17 are connected to each other, and diverse signals are inputted and outputted through a plurality of pins ENA, IAC, Vrms, Soft Start, GND, Vaout, Mult, CA, PK and Vcc. These are commonly provided in the conventionally used integrated circuit unit 41, not purposefully added to the integrated circuit for generating and outputting control signals, descriptions of which are thus omitted.

As shown, the gate driving unit 42, which outputs a drive signal according to the control signal outputted from the integrated circuit unit 41, includes: a first photocoupler IS01 turned on/off according to an outputted control signal; a first NPN transistor Q7 turned off when the first photocoupler IS01 is ON; a first PNP transistor Q4 turned off when the first photocoupler IS01 is ON; and a second NPN transistor Q3 turned on when the photocoupler IS01 is ON.

An output terminal of the first photocoupler IS01 is divided by resistance R10 and resistance R30 and connected to a base of the transistor Q7. Resistance R12 is connected in series to a collector of the first NPN transistor Q7. A base of the second NPN transistor Q3 and a base of the first PNP transistor Q4 are connected to each other and connected to a collector of transistor Q7. An emitter of the second NPN transistor Q3 is connected to resistance R15, and diode D3 is connected in parallel to resistance R15.

Operation power is supplied to the first photocoupler IS01 and to the transistors Q3 and Q4 through Vcc2.

An emitter of the second NPN transistor Q3 and an emitter of the first PNP transistor Q4 are connected in series to each other. When the photocoupler IS01 is in an ON state, the first PNP transistor Q4 is turned off, so that a current outputted from the emitter of the second NPN transistor Q3 is outputted as a drive signal through the GATE 2, not the SOURCE2.

In order to increase the strength of the current outputted through the drive signal, the gate driving unit 42 additionally includes a second photo coupler IS02, a third NPN transistor Q5, a second PNP transistor Q6, a fourth NPN transistor Q8, a plurality of resistances R23, R25, R26 and R31 and a diode D4, each corresponding to the photocoupler IO01, the second NPN transistor Q3, the first PNP transistor Q4, the plurality of resistances R10, R12, R15 and R30 and the diode D3.

The second photo coupler IS02, the third NPN transistor Q5, the fourth NPN transistor Q8 and the second PNP transistor Q6 operate in the same manner as the first photocoupler IS01, the NPN transistors Q3 and Q7 and the first PNP transistor Q6 as described above.

The DC stabilizer 43 includes: an insulation gate transistor Q1 (referred to as 'IGBT', hereinafter) turned on/off according to a driving signal inputted from the gate driving unit 42, a resistance R4 connecting the emitter and the base of the IGBT Q1, and a condenser C2 and a resistance R5 connected in parallel to the IGBT Q1. The condenser C2 and the resistance R5 are connected in series to each other.

When the drive signal is inputted, the IGBT (Q1) is turned on, without the drive signal, the IGBT (Q1) is turned off. The condenser C2 and the resistance R5 operate as snubber circuits for lowering a high voltage generated when the IGBT (Q1) is turned off, and the diode D1 provides a current path required when the IGBT (Q1) is turned off.

The DC stabilizer 43 additionally includes an IGBT (Q2), resistances R3 and R6 and a condenser C3 corresponding to the IGBT (Q1), the resistances R4 and R5 and the condenser C2. The IGBT (Q2), resistances R3 and R6 and a condenser C3 heighten a capacity of current applied to the DC link unit 44 through the DC stabilizer 43.

Accordingly, the voltage applied to the DC link unit 44 is supplied to the load unit 45, and the DC voltage finally inputted to the inverter unit 23 is a harmonic wave generation-restrained DC voltage which has been reduced.

Operations of the DC stabilizer 43, the ED link unit 44 and the load unit 45 will now be described through operation of an equivalent circuit.

Figure 5A:
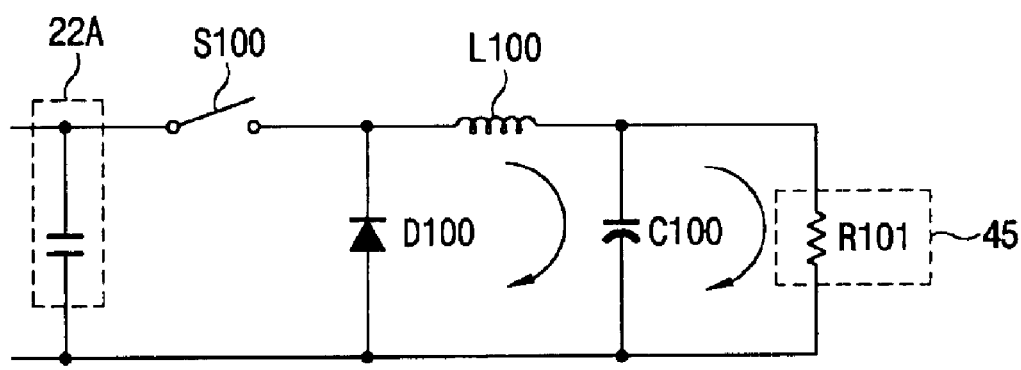
FIGS. 5A and 5B are equivalent circuit diagrams for a DC stabilizer, a DC link unit and a load unit of FIG. 4.
Figure 5B:
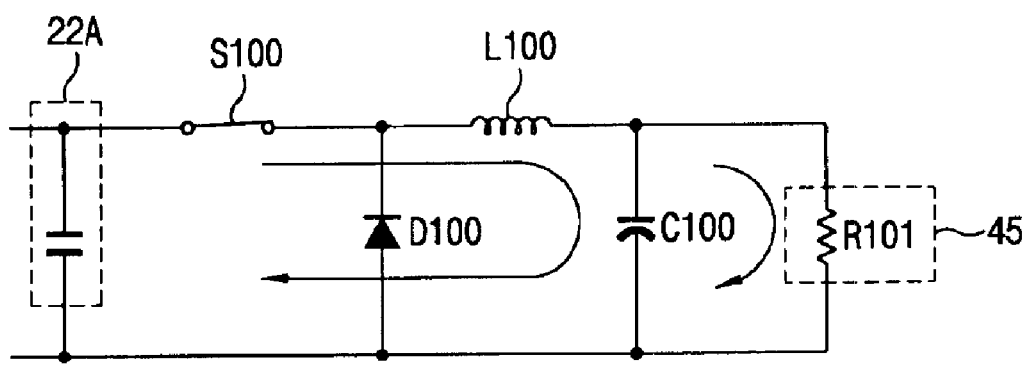

FIGS. 5A and 5B are equivalent circuit diagrams for a DC stabilizer, a DC link unit and a load unit of FIG. 4.

As illustrated, an equivalent circuit of the DC stabilizer 43, the DC link unit 44, the load unit 45 includes: a switch S100 connected in series to one side of the rectifying/outputting terminal 22A; a resistance R101 connected in series to another side of the rectifying/outputting terminal 22A; an inductor L100 connected in series to the switch s100 and to the resistance R101; a diode D100 connected in series to the switch S100 at one end; and a condenser C100 connected in series to the inductor L100.

The condenser C100 and the resistance R101 are connected n parallel to each other. The switch S100 is equivalent to the IGBT (Q1) and the IGBT (Q2). The diode D100 is equivalent to the diode D1. The condenser C100 is equivalent to the condenser C7.

The resistance R101 is an equivalent resistance corresponding to the load unit 45. The integrated circuit unit 41 turns on/off output of a control signal according to a value of voltage detected by the voltage measuring unit consisting of the resistances R1 and R2, according to which the gate driving unit 42 turns on/off output of a drive signal turning on/off the switch S100.

As shown in FIG. 5A, if the switch S100 is open, that is, the switch is in an OFF state, supplying of DC voltage outputted from the rectifying/outputting terminal 22A is cut off, and current flows to the diode D100 and to the load unit 45 by a voltage applied to the condenser C100 and an energy accumulated in the inductor L100.

As shown in FIG. 5B, in case that the integrated circuit unit 41 outputs a control signal, when the switch S100 is turned on, the diode D100 is turned off, a DC voltage is re-charged in the condenser C100 through the inductor L100 and, at the same time, current is supplied to the load unit 45, the resistance R101.

If the current measured at the resistance R8 is above the reference value or if a voltage above the reference value is supplied to the load unit 45, the integrated circuit unit 41 detects that and turns off output of a control signal, and accordingly, the switch S100 is turned off.

Accordingly, the reduced and constantly uniform DC voltage is finally supplied to the inverter unit 23.

As so far described, the driving apparatus and method of three-phase induction motor of the present invention has the following advantages.

That is, the power-factor degradation generated during supplying a DC voltage to the inverter to drive the three-phase induction motor is prevented, a harmonic wave is removed, and because a high-priced inverter component is not necessary, its relevant expense is reduced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A driving apparatus for a three-phase induction motor comprising:
    a three-phase power supply that supplies three-phase voltage;
    a rectifier that rectifies the three phase voltage supplied from the three phase power supply;
    a voltage reducer that reduces a DC voltage generated by the rectifier and outputs a stabilized DC voltage; and
    an inverter that varies the DC voltage output from the voltage reducer to a three-phase AC voltage and that drives the three-phase induction motor,
    said voltage reducer comprising:
    an integrated circuit that measures the DC voltage generated by the rectifier and that outputs a control signal to control the DC voltage output from the rectifier to the inverter;
    a gate driver that generates a drive signal to drive the inverter according to the control signal output from the integrated circuit;
    a DC stabilizer that reduces the DC voltage generated from the rectifier according to the drive signal of the gate driver, and that generates a stabilized DC voltage; and
    a DC link that links the DC voltage generated from the DC stabilizer to a load supplier that supplies the DC voltage applied to the DC link to the inverter.

2. The apparatus of claim 1, wherein the DC voltage input to the inverter is harmonic wave generation-restrained and voltage reduced.

3. The apparatus of claim 1, wherein the integrated circuit measures a current supplied from the rectifier to the DC stabilizer and turns off output of the control signal when the supplied current is an overcurrent.

4. The apparatus of claim 3, wherein the integrated circuit turns off output of the control signal when the voltage supplied to the DC link exceeds a reference value.

5. The apparatus of claim 1, wherein the voltage reducer further comprises a voltage measurer that measures a voltage linked to the DC link through the DC stabilizer.

6. The apparatus of claim 1, wherein the voltage reducer further comprises a switch that selectively supplies external power to the integrated circuit.

7. The apparatus of claim 1, wherein the DC stabilizer comprises:
    a transistor that is turned on when a drive signal is input from the gate driver; and
    a condenser and a resistance connected in series to each other and connected in parallel to the transistor.

8. The apparatus of claim 7, wherein when the transistor is turned on by the drive signal input from the gate driver as the control signal is output from the integrated circuit, the DC stabilizer reduces the DC voltage of the rectifier applied to the condenser and the resistance and links the DC voltage to the DC link.

9. The apparatus of claim 1, wherein the gate driver comprises:
    a photocoupler turned on/off according to the control signal output from the integrated circuit;

a first NPN transistor turned off when the photocoupler is turned on;

a first PNP transistor turned off when the photocoupler is turned on; and a second NPN transistor turned on when the first NPN transistor is turned off.

10. The apparatus of claim 9, wherein the gate driver further comprises a second photocoupler, a third NPN transistor, a second PNP transistor, a fourth NPN transistor and a third PNP transistor, each corresponding to the first photocoupler, the first NPN transistor, the first PNP transistor and the second NPN transistor.

11. The apparatus of claim 9, wherein, in the gate driver, a voltage output from the photocoupler is divided by first and second resistances and applied to a base of the first NPN transistor, a third resistance is connected to a collector; a connection terminal of a base of the second NPN transistor and a base of the first PNP transistor are connected to a collector of the first NPN transistor; an emitter of the second NPN transistor is connected to a fourth resistance; a diode is connected in parallel to the fourth resistance; and an emitter of the second NPN transistor is connected in series to an emitter of the first PNP transistor.

12. A method for driving a three-phase induction motor comprising:

rectifying a three-phase voltage;

measuring a magnitude of the rectified voltage;

generating a control signal based on the magnitude of the rectified voltage generating a drive signal based on the control signal;

reducing the rectified signal according to the drive signal with a DC stabilizer;

generating a stabilized DC voltage based on the rectified signal;

generating a three-phase AC voltage based on the stabilized DC voltage; and driving a three-phase induction motor with the three-phase AC voltage.

13. The method of claim 12, wherein the stabilized DC voltage is harmonic wave generation-restrained and voltage reduced.

14. The method of claim 12, further comprising:

measuring a current supplied from to the DC stabilizer; and turning off output of the control signal when the supplied current is an overcurrent.

15. The method of claim 12, further comprising:

turning off output of the control signal when the stabilized DC voltage exceeds a reference value.

* * * * *

UNITED STATES PATENT AND TRADEMARK OFFICE
CERTIFICATE OF CORRECTION

PATENT NO. : 6,876,171 B2 Page 1 of 1
DATED : April 5, 2005
INVENTOR(S) : J. C. Lee It is certified that error appears in the above-identified patent and that said Letters Patent is hereby corrected as shown below:

Title page,
Item [73], Assignee, after "Electronics" insert -- Inc. --.

Signed and Sealed this

Twenty-ninth Day of November, 2005

JON W. DUDAS
*Director of the United States Patent and Trademark Office*